Dec. 30, 1969  H. T. ROGERS  3,486,608
APPARATUS AND PROCESS FOR CONVEYING BARRELS
Filed Jan. 15, 1968

INVENTOR.
HARRY T. ROGERS
BY
*Wm. B. Price*
ATTORNEY

United States Patent Office 3,486,608
Patented Dec. 30, 1969

---

3,486,608
APPARATUS AND PROCESS FOR CONVEYING BARRELS
Harry T. Rogers, Box 84, Lebanon Junction, Ky. 40150
Continuation-in-part of application Ser. No. 659,793, Aug. 10, 1967. This application Jan. 15, 1968, Ser. No. 697,888
Int. Cl. B65g 25/04
U.S. Cl. 198—218           11 Claims

ABSTRACT OF THE DISCLOSURE

Discloses an apparatus and a process in the form of a reciprocating track conveying a line of barrels along a conveyor. The track is reciprocated at a faster speed in one direction to supply torque to the barrels in order to impart translatory rotation thereto which is translatable to the desired direction of travel. The opposite stroke of the track is at a much lower speed so that the torque applied to the barrels is less and the translatory rotation in the desired direction is not lost with the result that an undesired translatory rotation is not applied to the barrels.

CROSS REFERENCE TO RELATED APPLICATIONS

This application is a continuation in part of my co-pending application for "Barrel Driving and Chocking Device," Ser. No. 659,793, filed Aug. 10, 1967.

BACKGROUND OF THE INVENTION

This invention relates to a reciprocating conveyor for conveying barrels from one location to another. More specifically, this invention relates to a reciprocating track wherein the linear reciprocating movement of the track in one direction is at a higher speed than the reciprocating movement in the opposite direction. More specifically, this invention involves apparatus which will allow the accelerated reciprocating movement of the track in one direction to apply torque to the barrels on the track to impart a desired translatory rotation thereto and which on the slower reciprocating stroke will supply less torque to the barrels so that the desired translatory rotation of the barrels is utilized. Still more specifically, this invention involves a method and apparatus whereby the direction of the travel of the barrels may be reversed at will by reversing the speed of the reciprocating stroke in each direction.

DESCRIPTION OF THE PRIOR ART

Traditionally, in the whiskey industry, barrels have been moved from one location to another on an inclined track or on a track wherein the barrels were pushed along manually. The movement of a line of barrels along a track is complicated by the fact that as the rotational velocity of the barrel is translated into linear movement, the preceding barrel comes into contact with the rotating succeeding barrel so that a point of friction develops between the barrels at the point of contact, thus tending to stop or impede the rotational velocity of both barrels. This, of course, impedes or stops their linear movement down the track. This, coupled with the fact that barrels now in use, in many cases, have been previously used and therefore contain uneven staves, tends to cause more friction in between barrels than would be the case, as for example, with metal kegs or drums.

The appreciation of this problem is not new since in many industries, feed chutes have been designed to keep cylindrical objects such as gears from coming into contact with each other and thus damaging the gear teeth and becoming locked together. See, for example, the patent to Bassoff, No. 2,644,564, and the patent to Jessup et al., No. 2,903,116. As applied to barrels, the patent to Holmes et al., No. 235,531, provides a series of pawls pivotably mounted along a pair of skids or rails which were pivotable forwardly to allow the barrels to roll over said pawls and which were connected to a rod and lever which could be manipulated to push the barrels forwardly in the event two or more barrels became locked together.

SUMMARY OF THE INVENTION

According to my invention, the static rotational inertia of the barrel as well as the frictional engagement of one barrel against another, is overcome by means of a reciprocating track which reciprocates axially through a relatively slow strike (as distinguished from a vibrating conveyor). The stroke of the conveyor in one direction, however, is accelerated greatly in relation to the stroke of the conveyor in the other direction. Thus, during the accelerated stroke, torque is applied to the barrels on the conveyor so as to impart a translatory rotation in the desired direction of travel. The net effect of the accelerated stroke is that the barrels do not move appreciably down the track since the track is being retracted beneath them. However, on the decelerated stroke, in the desired direction of travel, the desired translatory rotation is not lost and the barrels translate this rotation to a linear movement down the track in the direction in which the track is moving. Since according to Newton's second Law, in linear movement, force is proportional to mass times acceleration, and in rotational movement, torque is proportional to rotational inertia times angular acceleration, the mass of the barrels in any instance is constant so that both force and torque become proportional to the acceleration of the track. Thus, the initial accelerated stroke increases the force or torque placed on the line of barrels and this torque is translated into translatory rotation. Since the succeeding stroke is decelerated, the torque acting on the barrels to impart an undesired translatory rotation, is much reduced, since, as stated previously, torque is proportional to acceleration. Thus, on the second stroke, the barrels are moved with the track forwardly and the desired translatory rotation obtained from the first stroke is not lost. On the succeeding accelerated stroke, the desired translatory rotation is again imparted to the line of barrels so that the succeeding slow and fast strokes operate to efficiently move the barrels down the line. Additionally, it is possible to reverse the direction of travel of the barrels by reversing the speed of the first and second strokes.

DESCRIPTION OF THE PREFERRED EMBODIMENT

Figure 1:
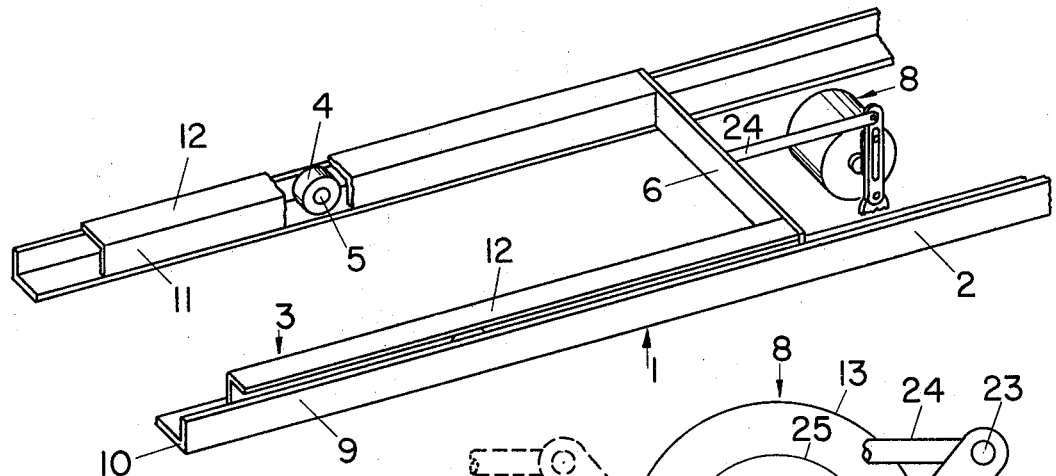
FIG. 1 is a fragmentary view, in perspective, of the apparatus of my invention with portions broken away to illustrate its structure.
Figure 2:
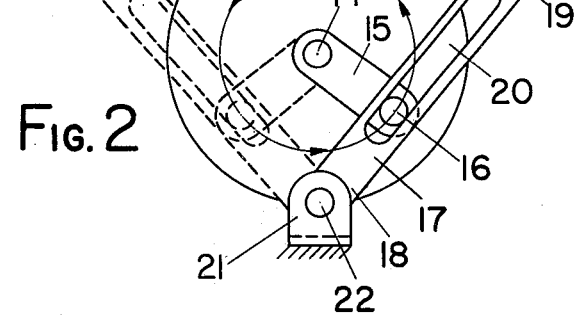
FIG. 2 is a side elevation of the means for reciprocating the rails of said apparatus.

Referring now to the drawings in detail, the reciprocating track 1 is made up of angle irons 2 and 3. Angle iron 2 contains a vertical leg 9 and a horizontal leg 10 and angle iron 3 contains a vertical leg 11 and a horizontal leg 12. Mounted on the inner surface of vertical leg 9 are a series of rollers 4 journaled on pin 5. A transverse connecting member 6 is joined to the two angle irons 3 so as to move same as a unit. The means for reciprocating the track almost frictionlessly over the rollers 4 is indicated generally by numeral 8.

Referring more specifically to the means 8 for reciprocating the track, the reciprocating means consist of reversible motor 13 having a shaft 14. Connected to the shaft 14 is driving arm 15 which forms an orbit 25 around shaft 14. Rotatably connected to the end of the driving arm 15 is cam wheel 16 which fits in slot 20 of the lever and cam follower assembly 17. The lever arm and cam follower assembly 17 consists of a base portion 18, a top free portion 19 and the longitudinal slot forming the camming surface 20. The base portion 18 of the lever arm and cam follower assembly 17 is pivoted by pin 22 to anchor bracket 21 so that the lever arm may move like an inverted pendulum between the two positions shown in the drawings.

Arm 24 pivotably connected by pin 23 to the free end 19 of lever arm and cam follower 17 is connected to the transverse connecting member 6 of the reciprocating track 1.

Figure 3:
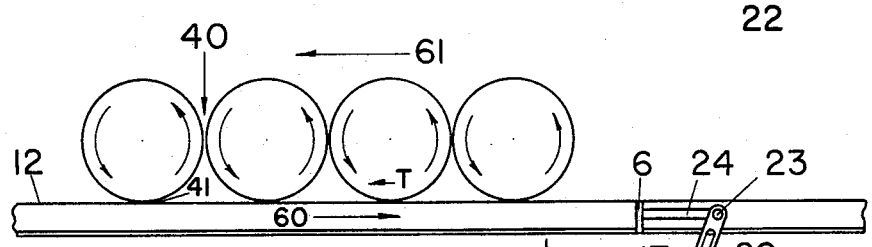
FIG. 3 is a diagrammatic view, illustrating the reciprocating track on its backward stroke and the coaction of the barrels with the track.
Figure 4:
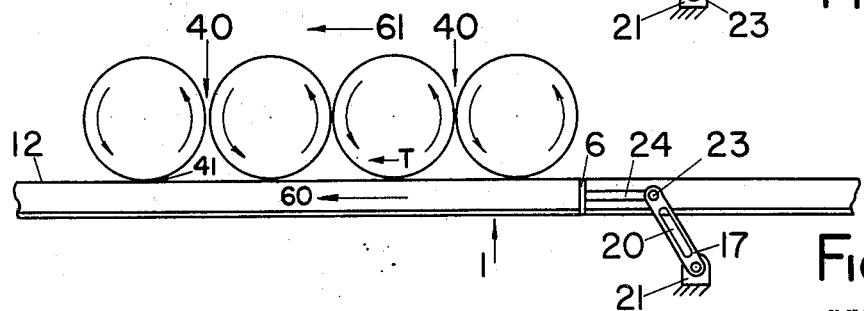
FIG. 4 is a diagrammatic view of the reciprocating track on its forward stroke.

As is shown in the drawing the cam wheel 16 rotatably connected to the driving arm 15 defines a circle or orbit 25 around the shaft 14 of the motor 13. In so doing, the cam wheel 16 slides along the camming surface 20 of longitudinal slot so as to move the lever arm back and forth in the two positions shown. When the rotation of the shaft 14 is in counterclockwise direction, the position of the lever arm 17, as shown in full lines, is at the end of the backward stroke. As the cam wheel moves upwardly, it forces the lever arm forwardly to the position shown in dotted lines to complete the forward stroke. As the cam wheel 16 is pulled downward along the longitudinal slot 20, there is a rapid change of cam angle at the bottom of the orbit so that there is a sudden movement of the lever arm backwardly in an accelerated backward stroke. Thus, it is seen that the speed of the backward stroke is much greater than the speed of the forward stroke so long as the shaft 14 of the motor is driven in counterwise direction. If the rotation of the shaft 14 is reversed, to clockwise direction, the accelerated stroke would be forwardly and the slow stroke would be backwardly. Referring now to FIG. 3, the track 1 is shown to be on the backward accelerated stroke as indicated by the arrow 60. This stroke, due to the frictional engagement 41 between the surface 12 of the track and the barrel imparts a translatory rotation to the barrel in the direction of the arrows. The reuslting translatory movement of the barrels then, is indicated by T which is in the same direction as the desired direction of travel 61. Actually, since the track is being suddenly retracted beneath the barrels, the net travel of the barrels is nil. Nevertheless, the torque applied to the barrels imparts the desired translatory rotation and direction T to said barrels so that on the forward stroke as illustrated in FIG. 4, at a decelerated speed, the desired translatory rotation is not lost and the barrels move forwardly in the direction 61 which corresponds with the direction of travel 60 of the track 1. The succeeding forward and backward strokes of the track 1 overcome the frictional engagement 40 between the barrels due to the opposing rotational velocity of succeeding barrels.

As previously mentioned, the force required to move an object is equal to the mass of the object times the acceleration. As applied to rotary movement, the torque required is equal to the rotational inertia of the object times the angular acceleration. Applying this to the invention, it will be seen that in any instance, the mass of the barrels on the track is constant. Therefore, both force and torque become proportional to the acceleration. As illustrated, since the backward stroke is much accelerated over the forward stroke, the torque applied to the barrels due to the frictional engagement of the barrel 41 on the surface 12 of the track is much greater so that considerable rotational velocity is obtained in the desired direction of travel. Since the forward stroke is decelerated relative to the backward stroke, the desired translatory rotation of the barrel is not lost and the barrels move along with the track in the desired direction of travel 61.

As previously indicated, if it is desired to reverse the direction of travel of the barrels, it is only necessary to reverse motor 13 and the shaft 14 so that the accelerated stroke then becomes the forward stroke and the decelerated stroke becomes the backward stroke.

It will be obvious to those skilled in the art that many modifications can be made from the detailed description hereinabove given, which is meant to be exemplary and non-limiting, except as to be commensurate in scope with the appended claims.

I claim:
1. An apparatus for conveying barrels, including:
 (A) a pair of spaced parallel rails in which the distance between the rails is less than the height of said barrels;
 (B) means for overcoming the rotational inertia of said barrels to move said barrels in a desired direction along said rails, comprising:
  (1) means for reciprocating said rails through a forward and backward axial stroke so that the speed of the forward stroke differs from the speed of the backward stroke.
2. An apparatus for conveying barrels, as defined in claim 1, in which:
 (A) the speed of the forward stroke is slower than the speed of the backward stroke.
3. An apparatus for conveying barrels, as defined in claim 1, in which:
 (A) said means for reciprocating said rails includes a driven shaft, and
 (B) motion translating means which translate rotary motion into reciprocating motion.
4. An apparatus for conveying barrels, as defined in claim 3, the further combination therewith of:
 (A) a transverse connecting member mounted to each rail of said pair of rails and which is in operative relation with said motion translating means.
5. An apparatus for conveying barrels, as defined in claim 3, in which:
 (A) said motion translating means comprises:
  (1) an arm connected at one end to said driven shaft so as to rotate therewith,
  (2) a cam rotatably mounted at the other end of said arm, so as to define an orbit around said driven shaft,
  (3) a cam follower and lever assembly including:
   (a) an elongated lever arm having a free end and a base end, and containing an elongated camming surface,
   (b) a stationary support pivotably connected to said base end of said lever arm,
   (c) said camming surface of said lever arm being in operative relation to said cam, and
   (d) said free end of said lever arm being operatively connected to said rails to reciprocate same through a forward and backward axial stroke.
6. An apparatus for conveying barrels as defined in claim 5, in which:
 (A) said elongated camming surface consists of an elongated slot along the central axis of said lever arm.
7. An apparatus as defined in claim 1, the further combination therewith of:
 (A) a series of friction reducing mounting means for said pair of spaced parallel rails.
8. An apparatus for conveying barrels, as defined in claim 1, in which:
 (A) said pair of spaced parallel rails consist of two angle irons connected together so as to move as a unit; the further combination therewith of mounting means including:

(1) a pair of inverted angle irons, and
(2) a series of rollers mounted along the vertical leg of each of said angle irons so as to project above said leg to provide a friction reducing mounting for said spaced parallel rails.

9. An apparatus for conveying barrels, as defined in claim 1, the further combination therewith of:
  (A) means for reversing the means for reciprocating said rails so that the speed of the forward stroke is changed relative to the speed of the backward stroke.

10. A process for conveying a line of barrels in a forward direction on a reciprocating conveyor, which comprises:
  (A) accelerating the backward stroke of said conveyor to apply torque to said barrels and impart a translatory rotation thereto through coaction between the barrels and the conveyor; and
  (B) decelerating the forward stroke of said conveyor relative to said backward stroke so as to move said barrels forwardly without imparting a reverse translatory rotation to said barrels.

11. A process of conveying barrels, as defined in claim 10, the improvement of reversing the direction of travel of said line of barrels, which comprises the steps of:
  (A) decelerating the backward stroke of said conveyor relative to the forward stroke; and
  (B) accelerating the forward stroke of said conveyor relative to the backward stroke.

References Cited

UNITED STATES PATENTS 1,763,307  6/1930  Hoffmann _____ 198—220

EDWARD A. SROKA, Primary Examiner